US012773913B2

(12) United States Patent
Moteki et al.

(10) Patent No.: US 12,773,913 B2
(45) Date of Patent: Oct. 27, 2026

(54) BATTERY ELECTRIC VEHICLE

(71) Applicant: TOYOTA JIDOSHA KABUSHIKI KAISHA, Toyota (JP)

(72) Inventors: Taro Moteki, Zama (JP); Tatsuya Imamura, Okazaki (JP); Yoichiro Isami, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/990,033

(22) Filed: Dec. 20, 2024

(65) Prior Publication Data

US 2025/0296451 A1 Sep. 25, 2025

(30) Foreign Application Priority Data

Mar. 21, 2024 (JP) ................................ 2024-044868

(51) Int. Cl.

*B60L 15/20* (2006.01)
*B60L 50/60* (2019.01)
(Continued)

(52) U.S. Cl.

CPC ........... *B60L 15/2054* (2013.01); *B60L 50/60* (2019.02); *B60W 10/08* (2013.01); *B60W 10/11* (2013.01); *B60L 2240/12* (2013.01); *B60L 2240/421* (2013.01); *B60L 2240/423* (2013.01); *B60L 2240/463* (2013.01); *B60L 2240/486* (2013.01);
(Continued)

(58) Field of Classification Search

CPC .. B60L 15/2054; B60L 50/60; B60L 2240/12; B60L 2240/421; B60L 2240/423; B60L 2240/463; B60L 2240/486; B60L 2250/28; B60L 15/20; B60L 2250/24; B60L 2250/26; B60W 10/08; B60W 10/11; B60W 2510/081; B60W 2510/083; B60W 2520/10; B60W 2520/30; B60W 2540/10; B60W 2710/083; B60W 2710/1005; B60W 2720/30; B60W 30/18; B60W 10/10; Y02T 10/72

See application file for complete search history.

(56) References Cited

U.S. PATENT DOCUMENTS

2020/0384856 A1* 12/2020 Wang .................. H02K 7/1846
2021/0229550 A1 7/2021 Isami
(Continued)

FOREIGN PATENT DOCUMENTS

JP 2001004016 A 1/2001
JP 6787507 B1 11/2020
(Continued)

*Primary Examiner* — Rami Khatib
(74) *Attorney, Agent, or Firm* — SoraIP, Inc.

(57) ABSTRACT

Vehicles according to embodiments of the present disclosure are battery electric vehicle having an electric motor as a driving source. The vehicle includes a transmission having a plurality of switchable gear ratios and a pseudo shifter capable of selecting a number of shift positions greater than the number of switchable gear ratios. The control device of the vehicle determines the combination of the motor torque of the electric motor and the gear ratio of the transmission so that the relationship between the accelerator operation amount, the vehicle speed, and the drive wheel torque is switched in accordance with the shift position selected by the pseudo shifter.

3 Claims, 6 Drawing Sheets

(51) Int. Cl.
*B60W 10/08* (2006.01)
*B60W 10/11* (2012.01)

(52) U.S. Cl.
CPC .... *B60L 2250/28* (2013.01); *B60W 2510/081* (2013.01); *B60W 2510/083* (2013.01); *B60W 2520/10* (2013.01); *B60W 2520/30* (2013.01); *B60W 2540/10* (2013.01); *B60W 2710/083* (2013.01); *B60W 2710/1005* (2013.01); *B60W 2720/30* (2013.01)

(56) References Cited

U.S. PATENT DOCUMENTS

| | | | | |
|---|---|---|---|---|
| 2022/0041064 | A1* | 2/2022 | Nishimine | B60L 50/10 |
| 2022/0194195 | A1* | 6/2022 | Serrao | B60W 10/30 |
| 2023/0250875 | A1* | 8/2023 | Satyanarayana | F16H 61/68<br>74/336 R |
| 2023/0382238 | A1 | 11/2023 | Isami et al. | |
| 2025/0087201 | A1* | 3/2025 | Palermo | B60W 50/16 |
| 2025/0145142 | A1* | 5/2025 | Imamura | B60Q 9/00 |
| 2025/0145146 | A1* | 5/2025 | Imamura | B60W 20/30 |

FOREIGN PATENT DOCUMENTS

| | | | |
|---|---|---|---|
| JP | 2022030872 | A | 2/2022 |
| JP | 2023173978 | A | 12/2023 |
| JP | 2024028601 | A * | 3/2024 |

* cited by examiner

BATTERY ELECTRIC VEHICLE

CROSS-REFERENCE TO RELATED APPLICATION

This application claims priority to Japanese Patent Application No. 2024-044868 filed on Mar. 21, 2024, incorporated herein by reference in its entirety.

BACKGROUND

1. Technical Field

The present disclosure relates to battery electric vehicles including an electric motor as a driving source.

2. Description of Related Art

Japanese Patent No. 6787507 (JP 6787507 B) discloses related art related to a battery electric vehicle that can simulate, by controlling an electric motor, manual shifting operations of a manual transmission internal combustion engine vehicle including an internal combustion engine as a driving source. The battery electric vehicle according to the related art includes a pseudo shift lever, and causes the electric motor to output torque according to a shift position of the pseudo shift lever and an accelerator operation amount.

SUMMARY

The above related art allows to experience operating a manual transmission internal combustion engine vehicle by the battery electric vehicle. However, a manual transmission that is operated in the related art is actually a virtual manual transmission. The driving force of the battery electric vehicle can be changed only within the driving force range determined by the maximum torque of the electric motor and the reduction ratio from the electric motor to drive wheels. Therefore, depending on the maximum torque of the electric motor, the driving force may be insufficient in a situation where a large driving force is required. In order to simply solve the issue of the insufficient driving force, the reduction ratio need only be increased. However, this may make it difficult for the battery electric vehicle to travel at high speeds due to the limitation on the motor rotational speed. In other words, with the above related art, it is not always possible to enjoy the same shifting operations as those of a manual transmission internal combustion engine vehicle in a wide range from a range in which a large driving force is required to a high speed range.

The present disclosure was made in view of the above issue. It is one object of the present disclosure to allows to enjoy the same shifting operations as those of a manual transmission internal combustion engine vehicle in a wide range in a battery electric vehicle that includes an electric motor as a driving source. The "wide range" herein refers to, for example, from a range in which a large driving force is required to a high speed range.

The present disclosure provides a battery electric vehicle that achieves the above object. According to one aspect of the present disclosure, a battery electric vehicle includes:

a transmission having a plurality of switchable gear ratios;

a pseudo shifter configured to select from a larger number of shift positions than the number of the gear ratios that are switchable by the transmission; and a control device configured to control an electric motor that is a driving source and the transmission. The control device is configured to determine a combination of motor torque of the electric motor and the gear ratio of the transmission in such a manner that a relationship among an accelerator operation amount, a vehicle speed, and drive wheel torque is switched according to the shift position selected by the pseudo shifter.

The battery electric vehicle of the present disclosure includes the combination of the electric motor and the transmission. This allows to drive in a wide range from a range in which a large driving force is required to a high speed range. In the battery electric vehicle of the present disclosure, the combination of the motor torque of the electric motor and the gear ratio of the transmission is determined according to the shift position selected by the pseudo shifter. This allows a driver to enjoy pseudo shifting at a larger number of gear ratios than the number of gear ratios of the transmission.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Configuration of Power System of Vehicle

Figure 1:
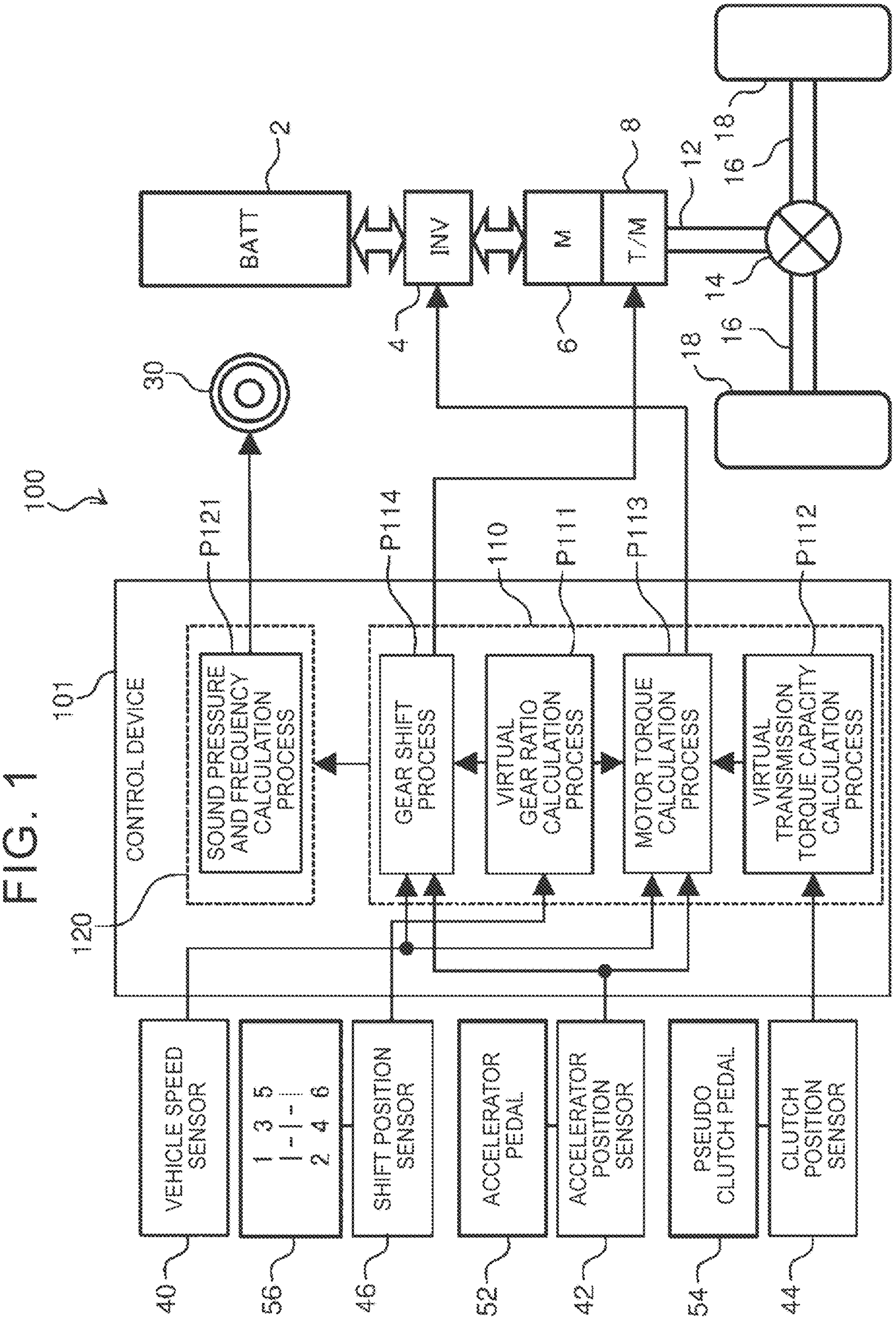
FIG. 1 is a diagram illustrating a configuration of a vehicle according to an embodiment of the present disclosure.

FIG. 1 is a diagram schematically illustrating a configuration of a vehicle 100 according to an embodiment of the present disclosure. First, a configuration of a power system of the vehicle 100 will be described with reference to FIG. 1.

The vehicle 100 includes an electric motor (M) 6 as a driving source for traveling. The vehicle 100 includes a battery (BATT) 2 and inverters (INV) 4. The battery 2 stores electrical energy for driving the electric motor 6. That is, the vehicle 100 is a battery electric vehicle (BEV) that travels with electric energy stored in the battery 2. The electric motor 6 is, for example, a three-phase AC motor. The inverter 4 is, for example, a voltage-type inverter, and controls the torque of the electric motor 6 by PWM control.

The output shaft of the electric motor 6 is connected to a transmission (T/M) 8. The transmission 8 is a stepped transmission having a switchable high-speed gear and a switchable low-speed gear. The high speed gear is a gear having a relatively high gear ratio capable of covering a high speed range. The low speed gear is a gear having a relatively low gear ratio capable of covering a region where a large driving force is required. The switching between the high-speed gear and the low-speed gear of the transmission 8 is performed by a control device 101 which will be described later.

The transmission 8 is connected to the differential gear 14 by means of a propeller shaft 12. The differential gear 14 is connected to the left and right drive wheels 18 by left and right drive shafts 16. The drive wheels 18 may be rear wheels or front wheels. However, the vehicle 100 may be configured as an all-wheel drive vehicle. In this case, a center differential gear may be provided in the propeller shaft 12, and the drive torque divided by the center differential gear may be transmitted to each of the front wheels and the rear wheels.

2. Configuration of Vehicle Control System

Next, the configuration of the control system of the vehicle 100 will be described with reference to FIG. 1.

The vehicle 100 includes a vehicle speed sensor 40. The vehicle speed sensor 40 is a sensor that outputs a signal corresponding to a traveling speed of the vehicle 100 (hereinafter, referred to as a vehicle speed). At least one wheel speed sensor (not shown) provided on each of the left and right front wheels and the left and right rear wheels is used as the vehicle speed sensor 40.

The vehicle 100 includes an accelerator position sensor 42. The accelerator position sensor 42 is provided on the accelerator pedal 52 and outputs a signal corresponding to an operation amount of the accelerator pedal 52. The operation amount of the accelerator pedal 52 means a depression amount of the accelerator pedal 52 by the driver, that is, an accelerator operation amount.

The accelerator pedal 52 is a driving operation member used for driving the vehicle 100. In addition to the accelerator pedal 52, the driving operation member includes a brake pedal (not shown). Apart from the driving operation members, the vehicle 100 includes a pseudo shift operation member that simulates an operation member used for the shift operation of the manual-shift type internal combustion engine vehicle. The pseudo shift operating member includes the following pseudo clutch pedal 54 and pseudo shifter 56.

The pseudo clutch pedal 54 is a dummy different from the original clutch pedal. The pseudo clutch pedal 54 has a structure similar to a clutch pedal of a conventional manual transmission type internal combustion locomotive. For example, the pseudo clutch pedal 54 includes a reaction force mechanism that generates a reaction force against depression by the driver. The position when the pedaling force is not applied is the start position of the pseudo clutch pedal 54, and the position when the pedaling force is depressed to the deepest position is the end position of the pseudo clutch pedal 54. The driver can operate the pseudo clutch pedal 54 against the reaction force from the reaction force mechanism from the start position to the end position.

The vehicle 100 includes a clutch position sensor 44. The clutch position sensor 44 is provided in the pseudo clutch pedal 54, and is a sensor that outputs a signal corresponding to an operation amount of the pseudo clutch pedal 54. The operation amount of the pseudo clutch pedal 54 means the amount of depression of the pseudo clutch pedal 54 by the driver.

The pseudo shifter 56 is a dummy different from the original shifter. The pseudo shifter 56 has a structure similar to that of an H-type shifter included in a conventional manual transmission type internal combustion locomotive. The pseudo shifter 56 has a shift lever as a shift operating member, and the lever can be moved along an H-shaped gate. Each gate is assigned a shift position. However, since the vehicle 100 does not include the actual transmission, the shift position of the pseudo shifter 56 is a virtual shift position. One feature of the vehicle 100 according to an embodiment of the present disclosure is that the number of shift positions selectable by the pseudo shifter 56 is greater than the number of gear stages that the transmission 8 has. In the example illustrated in FIG. 1, first gear, second gear, third gear, fourth gear, fifth speed, and sixth gear are provided as virtual shift positions. In a conventional manual transmission type internal combustion locomotive, first gear is a shift position having the largest gear ratio, and the gear ratio decreases in the order of second gear, third gear, fourth gear, fifth gear, and sixth gear.

The vehicle 100 includes a shift position sensor 46. The shift position sensor 46 is provided in the pseudo shifter 56, and is a sensor that outputs a signal indicating the shift position selected by the pseudo shifter 56. When the shift lever is not in any shift position, the shift position sensor 46 outputs a signal indicating the neutral position.

The vehicle 100 includes a control device 101. Sensors mounted on the vehicle 100 and devices to be controlled are connected to the control device 101 by an in-vehicle network. The vehicle speed sensor 40, the accelerator position sensor 42, the clutch position sensor 44, and the shift position sensor 46 are examples of sensors mounted on the vehicle 100.

The control device 101 is typically an electronic control unit (ECU). The control device 101 may be a combination of a plurality of ECU. The control device 101 includes an interface, a memory, and a processor (not shown). An in-vehicle network is connected to the interface. The memories include a RAM for temporarily recording data, and a ROM for storing programs executable by the processor and various data related to the programs. The program is composed of a plurality of instructions. The processor reads and executes a program and data from a memory, and generates a control signal based on a signal acquired from each sensor. The number of processors included in the control device 101 may be one or more. One or more processors constitute a processing circuit.

The control device 101 includes a drive wheel torque control device 110 and a sound control device 120. Specifically, when the program stored in the memory is executed by the processor, the processor functions as at least the drive wheel torque control device 110 and the sound control device 120. The processor functioning as the drive wheel torque control device 110 and the processor functioning as the sound control device 120 may be separate processors or may be the same processor.

3. Drive Wheel Torque Control

The drive wheel torque control device 110 is controlled by an inverter 4 and a transmission 8. The virtual shift position of the pseudo shifter 56 obtained from the signal of the shift position sensor 46 is input to the drive wheel torque control device 110. The drive wheel torque control device 110 executes a process P111 based on the virtual shift position. In the process P111, the virtual gear ratio of the vehicle 100 is calculated using a vehicle model, which will be described later, which is modeled on a manual transmission type internal combustion locomotive. The virtual gear ratio is a gear ratio of the virtual transmission virtually realized in the vehicle 100 by a combination of torque control of the electric motor 6 using the vehicle model and shift control of the transmission 8.

Further, the drive wheel torque control device 110 receives an amount of depression of the pseudo clutch pedal 54 (hereinafter, referred to as a clutch pedal depression amount) obtained from a signal of the clutch position sensor 44. The drive wheel torque control device 110 executes the process P112 based on the clutch pedal depression amount. In the process P112, the virtual transmission torque-capacity is calculated using the vehicle-model.

The drive wheel torque control device 110 further receives the vehicle speed obtained from the signal of the vehicle speed sensor 40 and the accelerator operation amount obtained from the signal of the accelerator position sensor 42. The drive wheel torque control device 110 executes the process P113 based on the vehicle speed, the accelerator operation amount, the virtual gear ratio calculated by the process P111, and the virtual transmission torque capacity calculated by the process P112. In the process P113, the motor torque generated by the electric motor 6 is calculated from the vehicle speed, the accelerator operation amount, the virtual gear ratio, and the virtual transmission torque capacity. The drive wheel torque control device 110 controls the inverter 4 so as to generate the motor torque obtained by the vehicle model.

The drive wheel torque control device 110 executes the process P114 based on at least one of the vehicle speed, the accelerator operation amount, and the virtual gear ratio calculated by the process P111. In the process P114, the gear stage of the transmission 8 is determined according to a predetermined control rule. The drive wheel torque control device 110 controls the transmission 8 to operate at the determined gear stage. In the transmission 8, switching from the high-speed gear to the low-speed gear, switching from the low-speed gear to the high-speed gear, or maintaining the current gear stage is performed.

Figure 2:
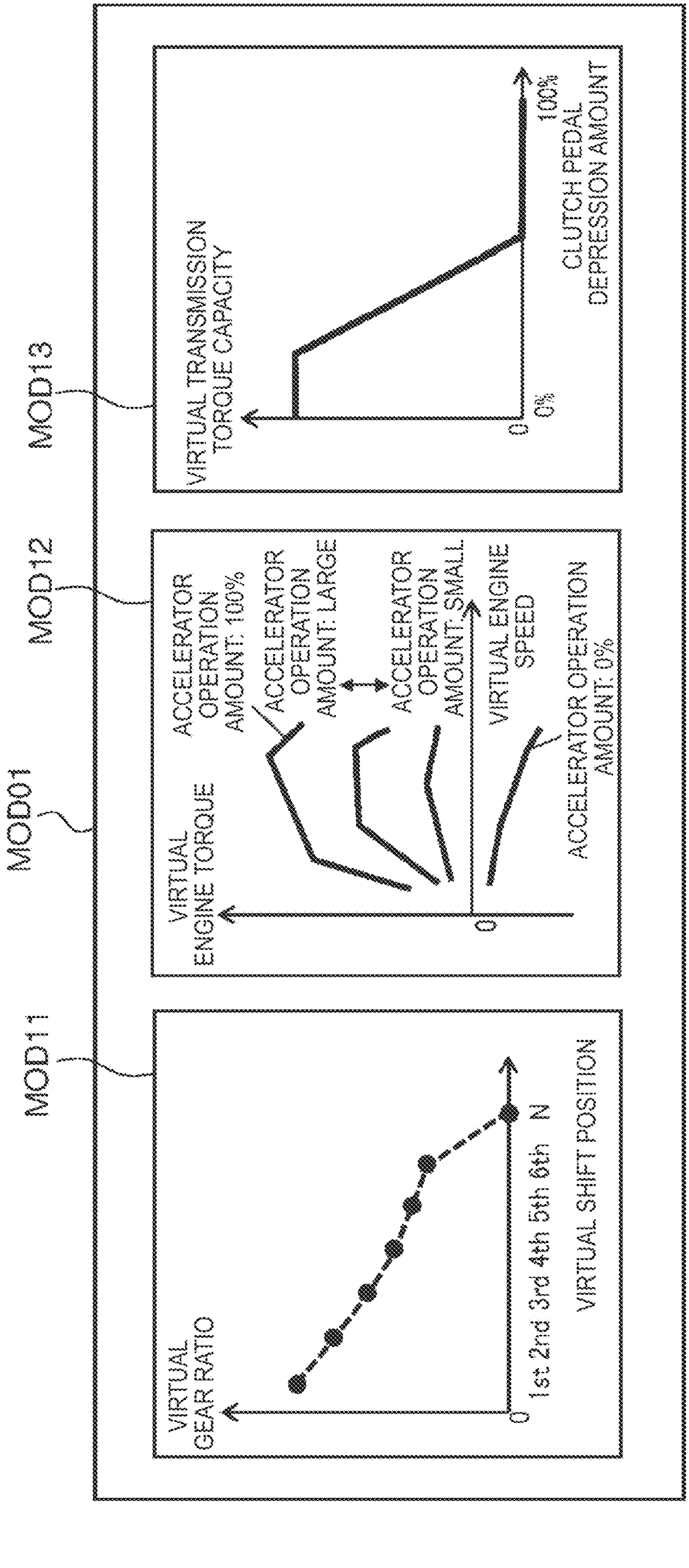
FIG. 2 is a diagram illustrating an example of a vehicle model according to an embodiment of the present disclosure.

Here, a vehicle model used by the drive wheel torque control device 110 will be described with reference to FIG. 2. As shown in FIG. 2, the vehicle model MOD01 includes a transmission model MOD11, an engine model MOD12, and a clutch model MOD13. A transmission virtually realized by the vehicle model MOD01 is referred to as a virtual transmission. In the transmission model MOD11, a virtual transmission is modeled. Further, an engine virtually realized by the vehicle model MOD01 is referred to as a virtual engine. In the engine model MOD12, a virtual engine is modeled. The clutch virtually realized by the vehicle model MOD01 is referred to as a virtual clutch. In the clutch model MOD13, a virtual clutch is modeled.

The transmission model MOD11 calculates a virtual gear ratio. The virtual gear ratio is a gear ratio determined by the virtual shift position in the virtual transmission. The virtual gear ratio is set for each virtual shift position. A maximum virtual gear ratio is set at first gear, and the virtual gear ratio is reduced in the order of second gear, third gear, fourth gear, fifth gear, and sixth gear. The transmission model MOD11 calculates the virtual transmission torque by using the virtual gear ratio and the virtual engine torque to be described later. The virtual transmission torque is a virtual torque output from the virtual transmission.

The drive wheel torque control device 110 calculates the motor torque based on the gear stage of the transmission 8 so that the drive wheel torque generated in the drive wheel 18 changes in accordance with the virtual transmission torque. A motor torque map, which will be described later, is used to calculate the motor torque based on the gear stage. The drive wheel torque control device 110 controls the inverter 4 to cause the electric motor 6 to output the motor torque calculated based on the gear stage of the transmission 8.

The engine model MOD12 calculates a virtual engine speed and a virtual engine torque. The virtual engine speed is calculated from the vehicle speed and the virtual gear ratio according to a predetermined calculation formula. When the virtual clutch is in the half-engaged state, the virtual engine speed is calculated from the vehicle speed, the virtual gear ratio, and the virtual slip ratio. The virtual engine torque is calculated from the virtual engine speed and the accelerator operation amount. In the engine model MOD12, the relation between the virtual engine speed and the virtual engine torque is defined for each accelerator operation amount. The torque characteristic of the engine model MOD12 may be set to a characteristic assumed for the gasoline engine, or may be set to a characteristic assumed for the diesel engine. In addition, the torque characteristics may be set to characteristics assumed for a natural intake engine, or may be set to characteristics assumed for a supercharged engine. When the virtual engine speed is reduced to a predetermined engine stall speed or lower, the virtual engine torque is set to zero after a very short time variation, and the virtual engine speed is also lowered to zero.

The clutch model MOD13 calculates a virtual transmission torque-capacity. The virtual transmission torque capacity means the transmission torque capacity of the virtual clutch. In the clutch model MOD13, the virtual transmission torque capacity is given to the clutch pedal depression amount. The clutch pedal depression amount is 0% at the start position of the pseudo clutch pedal 54 and 100% at the end position of the pseudo clutch pedal 54. When the clutch pedal depression amount is 100%, the virtual transmission torque capacity is zero. At this time, in the clutch model MOD13, the virtual clutch is completely released, and transmission of the virtual engine torque from the virtual engine to the virtual transmission is interrupted. When the clutch pedal depression amount is returned from the state of 100%, the state of the virtual clutch changes from the released state to the half-engaged state. As a result, the virtual transmission torque capacity starts to increase, and accordingly, the transmission of the virtual engine torque from the virtual engine to the virtual transmission is started. When the virtual transmission torque capacity becomes equal to or greater than the virtual engine torque, the state of the virtual clutch is in an engaged state, and all of the virtual engine torque output from the virtual engine is input to the virtual transmission. The above-described virtual slip rate may be calculated based on the virtual transmission torque capacity, or may be given to the clutch pedal depression amount in the map.

4. Motor Torque Map Details

The motor torque map is a map for determining the motor torque based on the gear stage of the transmission 8, that is, the gear ratio. The motor torque map is prepared for each gear stage of the transmission 8 and for each required value of the drive wheel torque. The required value of the drive wheel torque is equal to the virtual transmission torque multiplied by a predetermined reduction ratio. In the present embodiment, since the gears included in the transmission 8 are the low-speed gear and the high-speed gear, the low-speed gear map and the high-speed gear map are prepared for each required value of the drive wheel torque.

Figure 3:
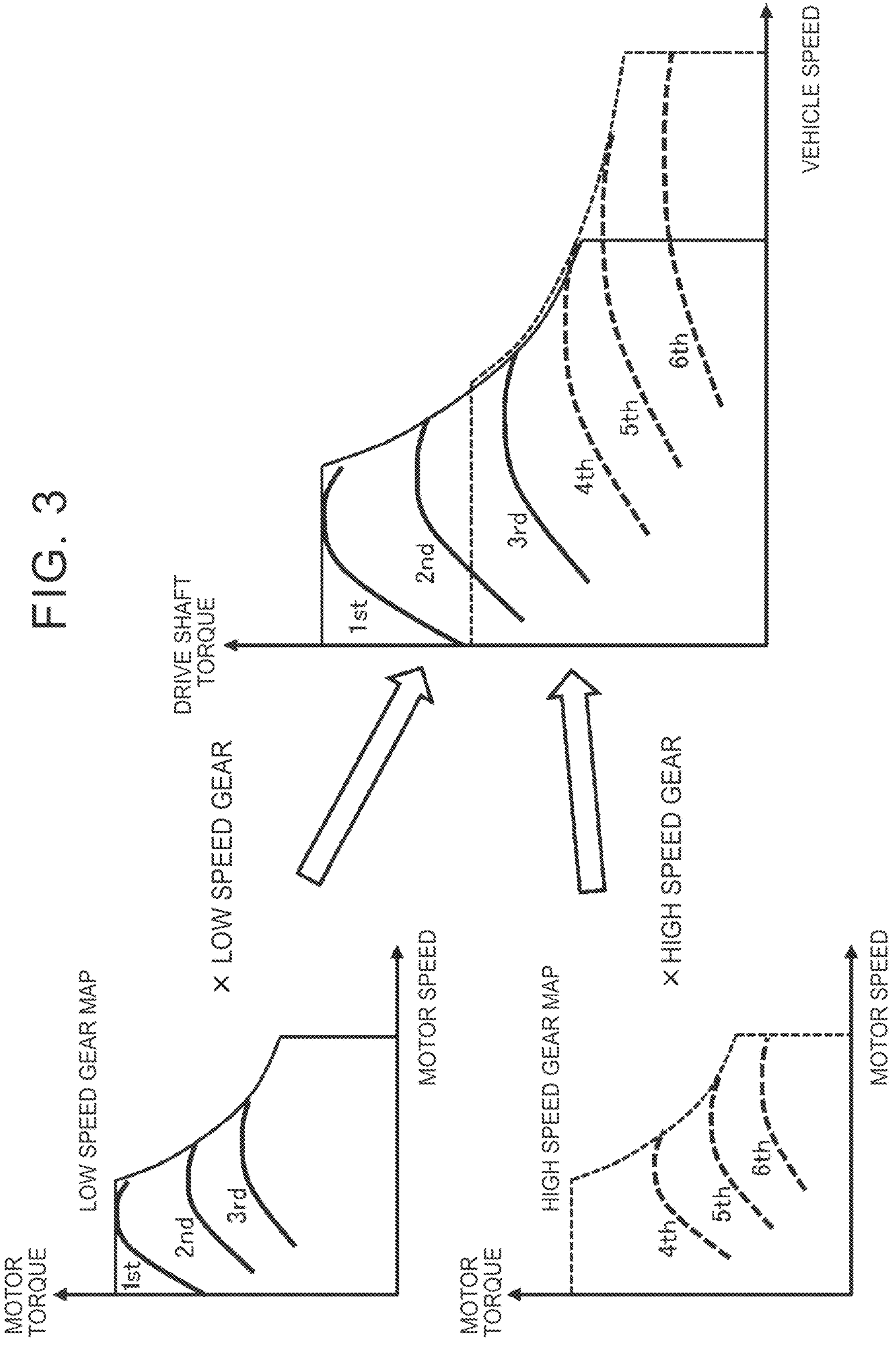
FIG. 3 shows a first example of a motor torque map for determining motor torque based on a gear stage of a transmission.

FIG. 3 is a diagram illustrating a first example of the motor torque map. In the low-speed gear map and the high-speed gear map in the first example, the size and the shape of the region defined by the motor torque and the motor speed coincide with each other. In the first example, first to third gears of the shift positions from first to sixth gears selectable by the pseudo shifter 56 are associated with the low speed gear. In the low-speed gear map, the relationship between the motor speed and the motor torque in the shift position from first to third gears is defined. Further, among the shift positions from first to sixth gears that can be selected by the pseudo shifter 56, from fourth to sixth gears are associated with the high speed gear. In the high-speed gear map, the relationship between the motor speed and the motor torque in the shift position from fourth to sixth gears is defined.

When the transmission 8 is operated by the low-speed gear, the drive wheel torque control device 110 selects a low-speed gear map corresponding to the required value of the drive wheel torque. The motor torque is determined based on the shift position selected by the pseudo shifter 56 and the motor speed according to the selected low-speed gear map. When the transmission 8 is operated with a high-speed gear, a high-speed gear map corresponding to the required value of the drive wheel torque is selected. The motor torque is determined based on the shift position selected by the pseudo shifter 56 and the motor speed according to the selected high-speed gear map. The motor speed used for determining the motor torque is the required motor speed, and is calculated based on the virtual gear ratio determined by the shift position selected by the pseudo shifter 56 and the vehicle speed.

As described above, by switching the motor torque map according to the gear stage of the transmission 8, the drive wheel torque-vehicle speed characteristic as shown in the graph on the right of FIG. 3 is realized. As shown in this characteristic diagram, by combining the transmission 8 with the electric motor 6, it is possible to operate in a wide range from a low-speed range to a high-speed range in which a large driving force is required. The combination of the motor torque of the electric motor 6 and the gear ratio of the transmission 8 is determined in accordance with the shift position of the pseudo shifter 56. As a result, the driver can enjoy pseudo shifting at a number of gear ratios that is larger than the number of gear stages included in the transmission 8.

Figure 4:
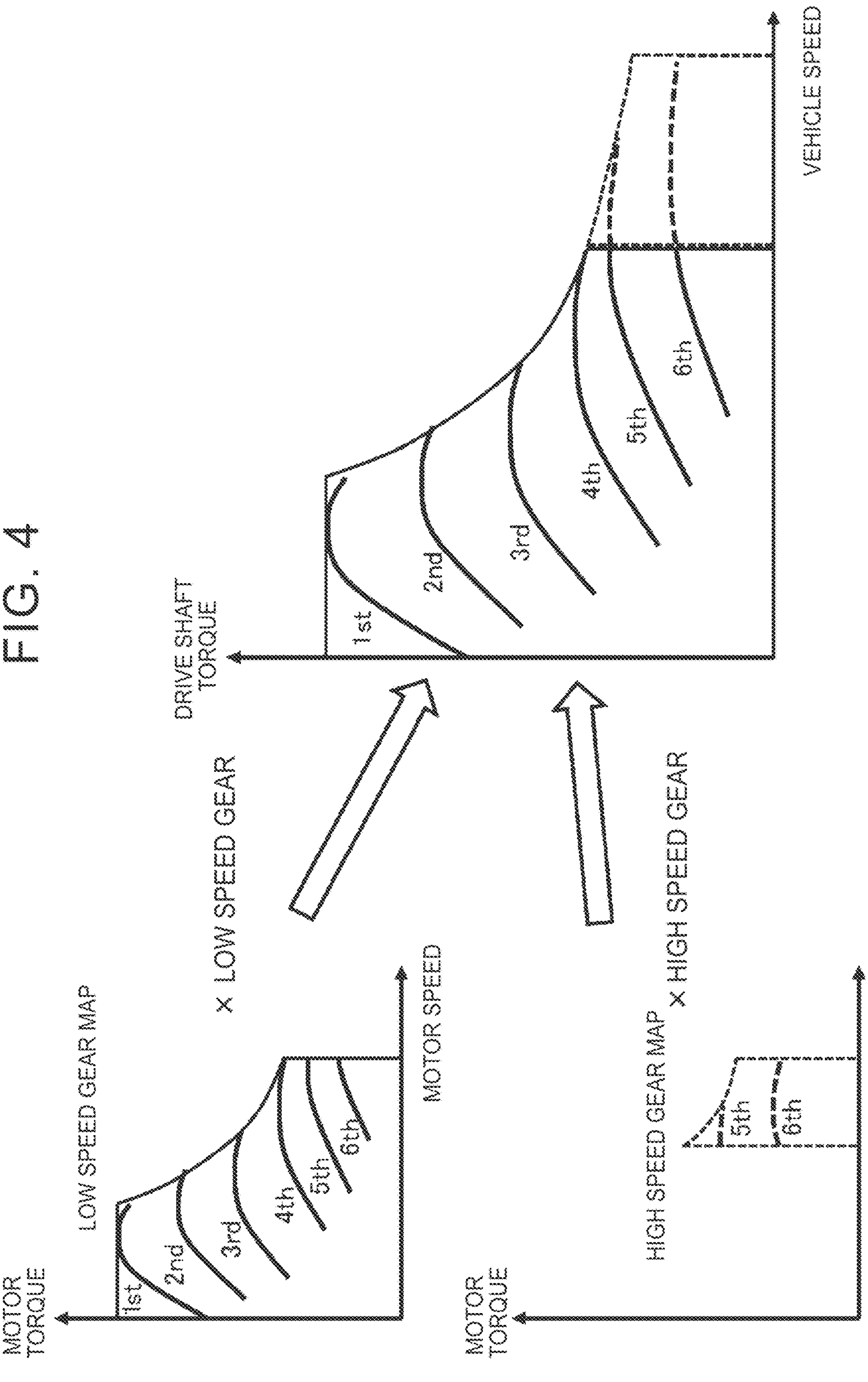
FIG. 4 shows a second example of a motor torque map for determining motor torque based on a gear stage of a transmission.

FIG. 4 is a diagram illustrating a second example of the motor torque map. In the second example, the region in which the low-speed gear map is defined is a full region, whereas the high-speed gear map is defined as being limited to a part of the region on the high-speed side of the low-speed gear map. In the second example, one to six of the shift positions selectable by the pseudo shifter 56 from first to sixth gears are associated with the slow gear. In the low-speed gear map, the relationship between the motor speed and the motor torque in the shift position from first to sixth gears is defined. Further, among the shift positions from first to sixth gears that can be selected by the pseudo shifter 56, fifth and sixth gears are associated with the high speed gear, and the relationship between the motor speed and the motor torque in the shift positions of fifth and sixth gears is defined in the high speed gear map.

The relationship between the motor speed and the motor torque in shift positions of fifth and sixth gear of the pseudo shifter 56 is defined in both the low-speed gear map and the high-speed gear map. In the graph to the right of FIG. 4, both drive wheel torques are depicted. The drive wheel torque realized by operating the transmission 8 with the low-speed gear and controlling the electric motor 6 according to the low-speed gear map when the shift positions of fifth and sixth gears are selected by the pseudo shifter is illustrated by a solid line. On the other hand, the drive wheel torque realized by operating the transmission 8 with the high-speed gear and controlling the electric motor 6 according to the high-speed gear map when the shift positions of fifth and sixth gears are selected by the pseudo shifter is illustrated by a broken line. As can be seen from the comparison between the two, the low-speed gear map and the high-speed gear map are created such that the drive wheel torque is continuous with the change in the vehicle speed in switching between the low-speed gear and the high-speed gear.

In the second example, the low-speed gear is a normal gear having a normal gear ratio, and the high-speed gear is a gear for high-speed traveling having a high-speed gear ratio lower than the normal gear ratio. When the drive wheel torque control device 110 switches the low-speed gear and the high-speed gear according to the vehicle speed, the driver can enjoy the same shift operation as that of the manual transmission type internal combustion locomotive in a wide range from the low-speed range to the high-speed range in which a large driving force is required.

Figure 5:
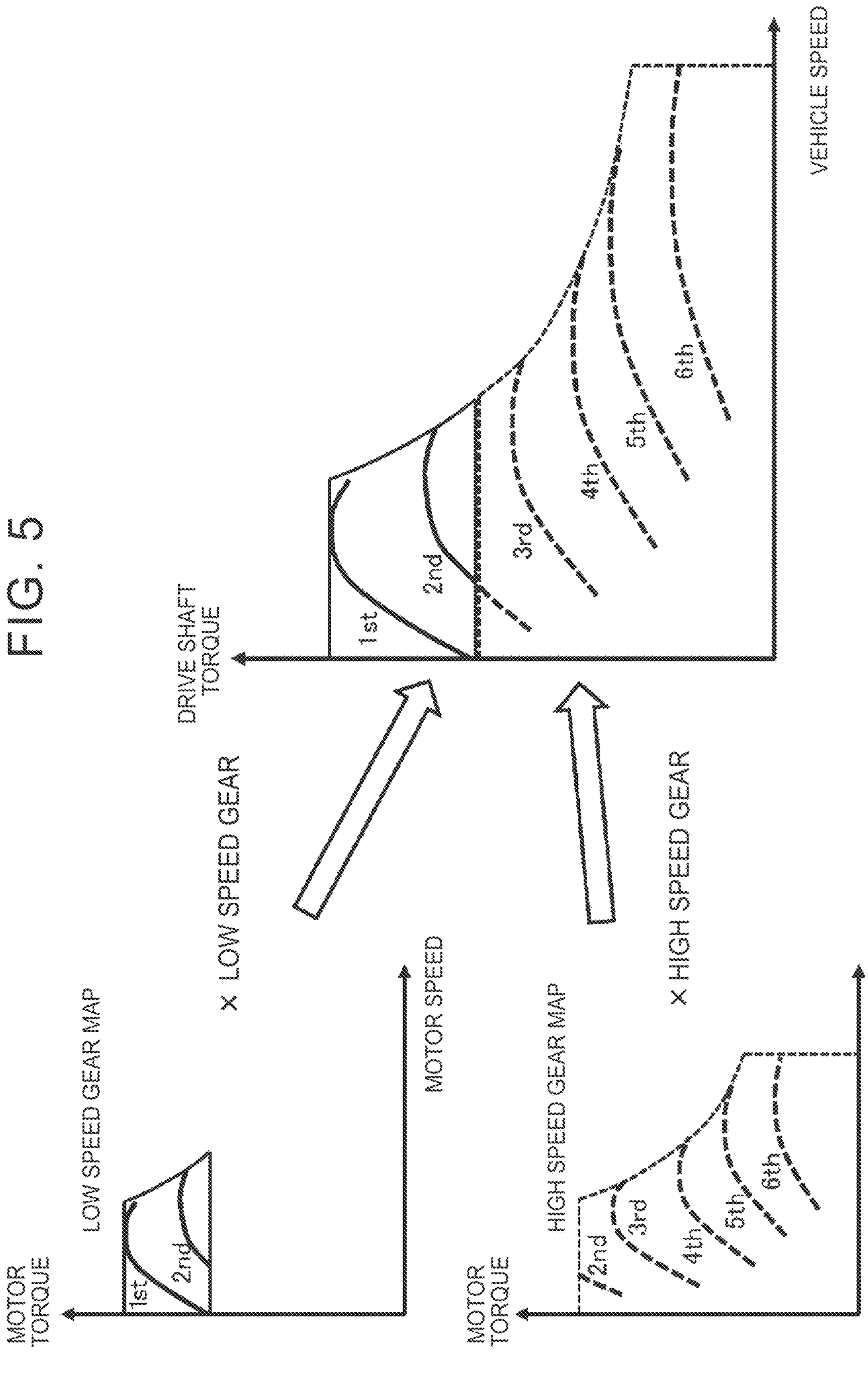
FIG. 5 shows a third exemplary motor torque map for determining motor torque based on the gear stage of the transmission.

FIG. 5 is a diagram illustrating a third example of the motor torque map. In the third example, the region in which the high-speed gear map is defined is a full region, while the low-speed gear map is defined as a partial region on the large drive wheel torque side of the high-speed gear map. In the third example, one and two of the shift positions from first to sixth gears selectable by the pseudo shifter 56 are associated with the low speed gear. In the low-speed gear map, the relationship between the motor speed and the motor torque in the shift positions of first and second gears is defined. Further, among the shift positions from first to sixth gears that can be selected by the pseudo shifter 56, from second to sixth gears are associated with the high speed gear. In the high-speed gear map, the relationship between the motor speed and the motor torque in the shift position from second to sixth gears is defined.

The relationship between the motor speed and the motor torque in the shift position of second speed of the pseudo shifter 56 is defined in both the low-speed gear map and the high-speed gear map. In the graph to the right of FIG. 5, the drive wheel torque realized by operating the transmission 8 with the low-speed gear and controlling the electric motor 6 according to the low-speed gear map when the shift position of second gear is selected by the pseudo shifter is illustrated by a solid line. On the other hand, the drive wheel torque realized by operating the transmission 8 with the high-speed gear and controlling the electric motor 6 according to the high-speed gear map when the 2-speed shift position is selected by the pseudo shifter is illustrated by a broken line. As can be seen from the comparison between the two, the low-speed gear map and the high-speed gear map are created such that the drive wheel torque is continuous with the change in the vehicle speed in switching between the low-speed gear and the high-speed gear.

In the third example, the high-speed gear is a normal gear having a normal gear ratio, and the low-speed gear is a gear for a large driving force having a low gear ratio higher than the normal gear ratio. When the drive wheel torque control device 110 switches the low-speed gear and the high-speed gear in accordance with the required value of the drive wheel torque, the driver can enjoy the same shift operation as that of the manual shift type internal combustion locomotive in a wide range from the low-speed range to the high-speed range in which a large driving force is required.

5. Sound Control

Returning again to FIG. 1, sound control by the sound control device 120 will be described. Sound control is a control that auditorily gives the driver a sense of driving a manually-shifted internal combustion engine. The control target of the sound control is the sound generator 30. Sound artificially generated by the sound generator 30 is output from a speaker installed in the vehicle cabin of the vehicle 100. The sound generator 30 may generate various sounds. One of the artificial sounds is a pseudo engine sound simulating an engine sound in a conventional engine car. The sound generator 30 changes the sound pressure and frequency of the pseudo engine sound generated from the speaker.

The sound control device 120 executes process P121 based on the virtual engine speed and the virtual engine torque inputted from the drive wheel torque control device 110. In the process P122, the sound pressure of the pseudo engine sound is calculated using the sound pressure map, and the frequency of the pseudo engine sound is calculated using the frequency map. In the sound pressure map, sound pressure data is set with respect to the virtual engine speed such that the sound pressure increases as the virtual engine speed increases. In addition, the sound pressure data is set for the virtual engine torque so that the sound pressure increases as the virtual engine torque increases. In the frequency map, the frequency data is set with respect to the virtual engine speed so that the higher the virtual engine speed, the higher the frequency. Therefore, the sound pressure and frequency of the pseudo engine sound emitted from the speaker are changed by the operation of the accelerator pedal 52 by the driver, and are also changed by the operation of the pseudo clutch pedal 54 and the operation of the pseudo shifter 56. By listening to the pseudo engine sound whose sound pressure and frequency change in this way, the driver can hear the feeling of driving the manual transmission type internal combustion engine.

6. Modification

Figure 6:
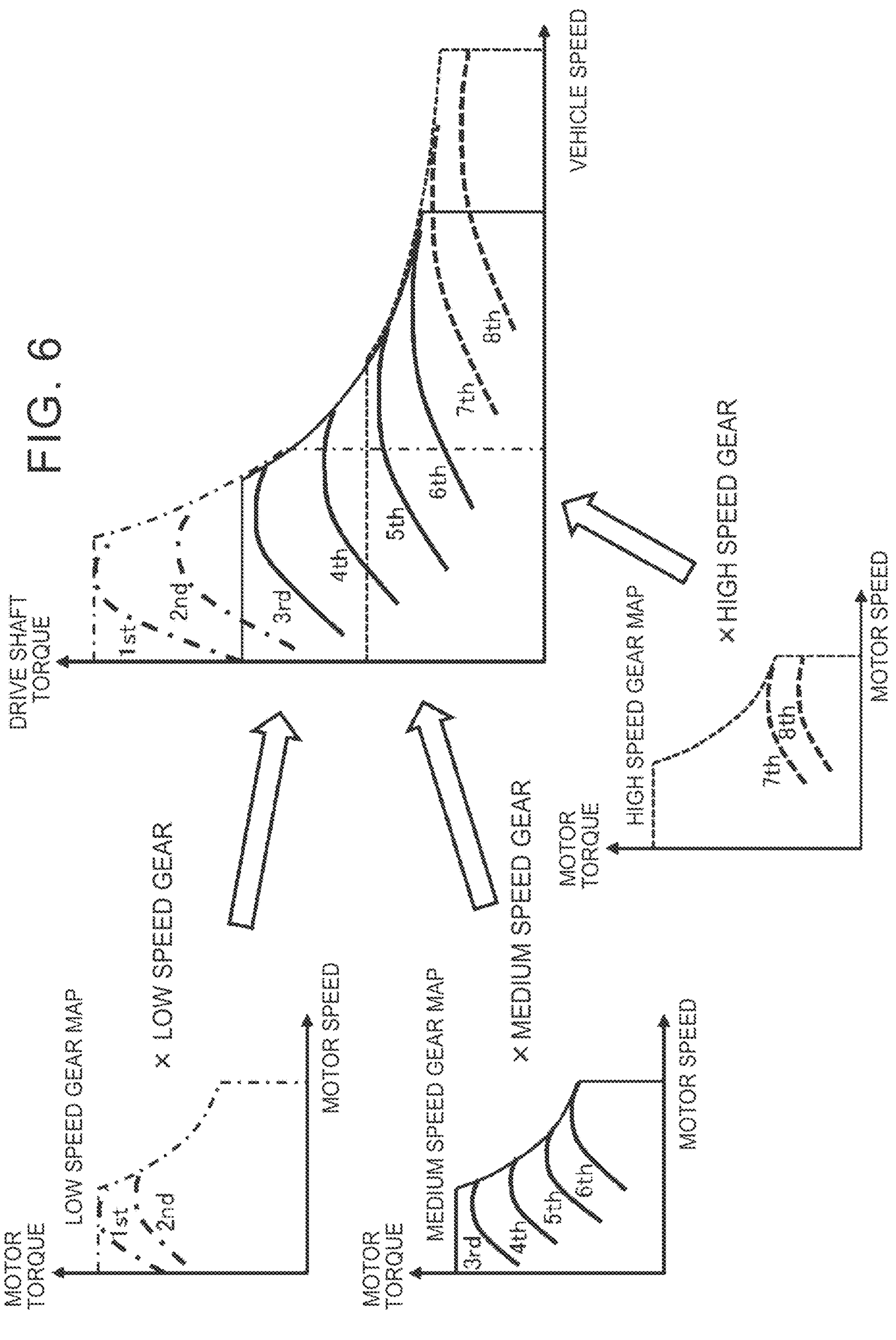
FIG. 6 is a diagram illustrating an example of a motor torque map when the transmission is a three-stage shift.

In the above-described embodiment, the transmission 8 has two gear stages, but the transmission 8 may have three or more gear stages. Even if the gear stage of the transmission 8 is any number of stages, a map in which the relationship between the motor speed and the motor torque is defined for each shift position of the pseudo shifter 56 may be prepared for each required value of the drive wheel torque and each gear stage. For example, in a case where the gear stage of the transmission 8 is three stages, as shown in FIG. 6, it is sufficient that a low-speed gear map, a medium-speed gear map, and a high-speed gear map are prepared. In the example illustrated in FIG. 6, the relationship between the motor speed and the motor torque in the shift positions of first and second gears is defined in the low-speed gear map. The relationship between the motor speed and the motor torque in the shift position from third to sixth gears is defined in the middle speed gear map. The relationship between the motor speed and the motor torque in the shift positions of seventh and eighth gears is defined in the high-speed gear map. The transmission 8 may be a continuously variable transmission having a step transmission function.

In the above-described embodiment, the accelerator pedal 52 is a pedal-type operating tool operated by a foot, but may be a lever-type operating tool operated by a hand. The pseudo clutch pedal 54 is a pedal-type operation device operated by a foot, but may be a lever-type operation device or a dial-type operation device operated by a hand.

In the above-described embodiment, the pseudo shifter 56 is an H-type shifter, but the H-type shifter is an absolute instruction shifter whose shift positions are associated with predetermined physical positions and configured to select the physical position with a shift operation member. In contrast, a sequential shifter such as a paddle shifter is a relative instruction shifter in which an increase or decrease in an instruction value of the shift position is associated with a relative operation of a shift operation member. The pseudo shifter 56 may be a relative instruction shifter.

The disclosed driving torque control technique is not limited to the battery electric vehicle (BEV), and can be widely applied to any battery electric vehicle in which an electric motor is used as a driving power device. For example, the disclosed driving torque control technique can be applied to a hybrid battery electric vehicle (HEV) or a plug-in hybrid battery electric vehicle (PHEV) that runs only with the driving force of an electric motor. The disclosed driving torque control technique can also be applied to a fuel cell battery electric vehicle (FCEV) that supplies electric energy generated by a fuel cell to an electric motor.

What is claimed is:

1. A battery electric vehicle including an electric motor as a driving source, the battery electric vehicle comprising:

a transmission having a plurality of switchable gear ratios;

a pseudo shifter configured to select from a larger number of shift positions than the number of the switchable gear ratios of the transmission; and a control device configured to control the electric motor and the transmission, wherein the control device is configured to determine a combination of motor torque of the electric motor and the gear ratio of the transmission in such a manner that a relationship among an accelerator operation amount, a vehicle speed, and drive wheel torque is switched according to the shift position selected by the pseudo shifter, wherein the control device has a map for each of required values of the drive wheel torque and each of the gear ratios of the transmission, the map defining, for each of the shift positions of the pseudo shifter, a relationship between a motor speed of the electric motor and the motor torque, the control device is configured to determine the motor torque based on the shift position selected by the pseudo shifter according to the map corresponding to the gear ratio at which the transmission is to be operated and the required value of the drive wheel torque, the relationship between the motor speed and the motor torque in a predetermined shift position out of the shift positions selectable by the pseudo shifter is defined by both the map for a first gear ratio out of the gear ratios and the map for a second gear ratio next to the first gear ratio, and the drive wheel torque that is implemented by operating the transmission at the first gear ratio and controlling the electric motor according to the map for the first gear ratio when the predetermined shift position is selected by the pseudo shifter and the drive wheel torque that is implemented by operating the transmission at the second gear ratio and controlling the electric motor according to the map for the second gear ratio when the predetermined shift position is selected by the pseudo shifter are continuous with respect to a change in the vehicle speed.

2. The battery electric vehicle according to claim 1, wherein:

one or more of the shift positions selectable by the pseudo shifter are associated with each of the gear ratios of the transmission; and the map for each of the gear ratios defines the relationship between the motor speed and the motor torque in the one or more shift positions associated with the gear ratio.

3. The battery electric vehicle according to claim 1, wherein the pseudo shifter includes either or both of an absolute instruction shifter whose shift positions are associated with predetermined physical positions and configured to select the physical position with a shift operation member, and a relative instruction shifter in which an increase or decrease in an instruction value of the shift position is associated with a relative operation of the shift operation member.

* * * * *